(12) United States Patent
Zheng

(10) Patent No.: US 8,150,429 B1
(45) Date of Patent: Apr. 3, 2012

(54) COST-EFFECTIVE VOTING

(75) Inventor: Lantian Zheng, San Jose, CA (US)

(73) Assignee: Google Inc., Mountain View, CA (US)

( * ) Notice: Subject to any disclaimer, the term of this patent is extended or adjusted under 35 U.S.C. 154(b) by 291 days.

(21) Appl. No.: 12/396,728

(22) Filed: Mar. 3, 2009

(51) Int. Cl.
*H04W 4/00* (2009.01)

(52) U.S. Cl. ............... 455/466; 455/414.1; 455/2.01; 379/92.01; 379/92.02; 379/92.03; 379/92.04

(58) Field of Classification Search ............... 455/2.01, 455/414, 466; 379/92.01–92.04, 90.01, 88.08, 379/88.11; 705/10
See application file for complete search history.

(56) References Cited

U.S. PATENT DOCUMENTS

| | | | |
|---|---|---|---|
| 6,457,045 B1 * | 9/2002 | Hanson et al. ............... 709/206 |
| 2004/0157628 A1 * | 8/2004 | Daniel et al. ............... 455/466 |
| 2007/0288546 A1 * | 12/2007 | Rosenberg ............... 709/201 |
| 2009/0307065 A1 * | 12/2009 | Kincaid ............... 705/12 |
| 2010/0136948 A1 * | 6/2010 | Bychkov et al. ............... 455/406 |

* cited by examiner

*Primary Examiner* — Marivelisse Santiago Cordero
*Assistant Examiner* — Dung Hong
(74) *Attorney, Agent, or Firm* — Fish & Richardson P.C.

(57) ABSTRACT

The subject matter of this specification can be embodied in, among other things, a method that includes receiving an electronic voting request from an originating mobile device at a recipient mobile device. Each mobile device is associated with a member of a voting group. The electronic voting request includes a voting ballot and instructions, that when executed by a processor, perform operations including generating a vote based on information in the voting ballot and transmitting the voting request to at least a portion of other members of the voting group that have not received the voting request. The operations also include receiving votes from the portion of the other members to which the voting request was transmitted and transmitting a tally of the received votes to the originating mobile device.

21 Claims, 10 Drawing Sheets

COST-EFFECTIVE VOTING

TECHNICAL FIELD

This instant specification relates to communication.

BACKGROUND

Mobile communication devices such as cellular telephones and personal digital assistants have become increasingly popular. People often rely on these devices to communicate with one another, especially to arrange impromptu gatherings or quickly reach a consensus on an issue. For example, a group of friends may call one another to discuss which movie they are going to see or where they should meet to have dinner.

A popular way of communicating using these devices is by means of Short Message Service (SMS) text messages. These text messages may be transmitted from device to device and are particularly useful in situations where placing or taking a call maybe inappropriate (e.g., in a library). However, many service providers charge a fee for each text message sent and received by the device. Consequently, communicating with a group using SMS messages can be expensive for the user responsible for sending and receiving the bulk of the text messages.

SUMMARY

In general, this document describes systems and techniques for cost-effective voting using mobile devices. For example, an SMS text message including a voting request (e.g., a ballot) and forwarding instructions may be propagated among a set of mobile devices in a first sequence. Responses to the ballot may be transmitted among the mobile devices in a second sequence that is different from the first sequence. The result of the vote may be transmitted among the devices in a third sequence that is also different from the first sequence.

For example, an originating device can transmit an SMS text message that includes a ballot and forwarding instructions to a first set of mobile devices. The first set of mobile devices can, in turn, transmit the text message to a second set of mobile devices specified by the forwarding instructions. This forwarding process can be repeated until the message has reached a specified set of mobile devices. Responses to the ballot can be transmitted from a receiving device to a device that transmitted the ballot to the receiving device until, in some cases, the responses reach the originating device. These responses may be tabulated, and an SMS message containing the result of the vote and forwarding instructions may be transmitted to another set of the devices. Then the forwarding process described above may be repeated. Transmitting messages in this way can disperse the cost of transmitting the messages among the mobile devices.

DESCRIPTION OF DRAWINGS

Like reference symbols in the various drawings indicate like elements.

DETAILED DESCRIPTION

In general, this document describes systems and techniques for dispersing communication costs across a group. In some implementations, the cost of conducting a vote via text message may be spread across a group of cellular telephone users. For example, a text message may include transmission instructions and a voting request. The text message may be disseminated among a group of devices according to the forwarding instructions. Responses to the voting request may be transmitted from receiving devices to the devices that transmitted the message to the receiving devices. The responses may be tabulated and the result may be broadcast among the participating devices in an order different from the initial transmission order.

Figure 1A:
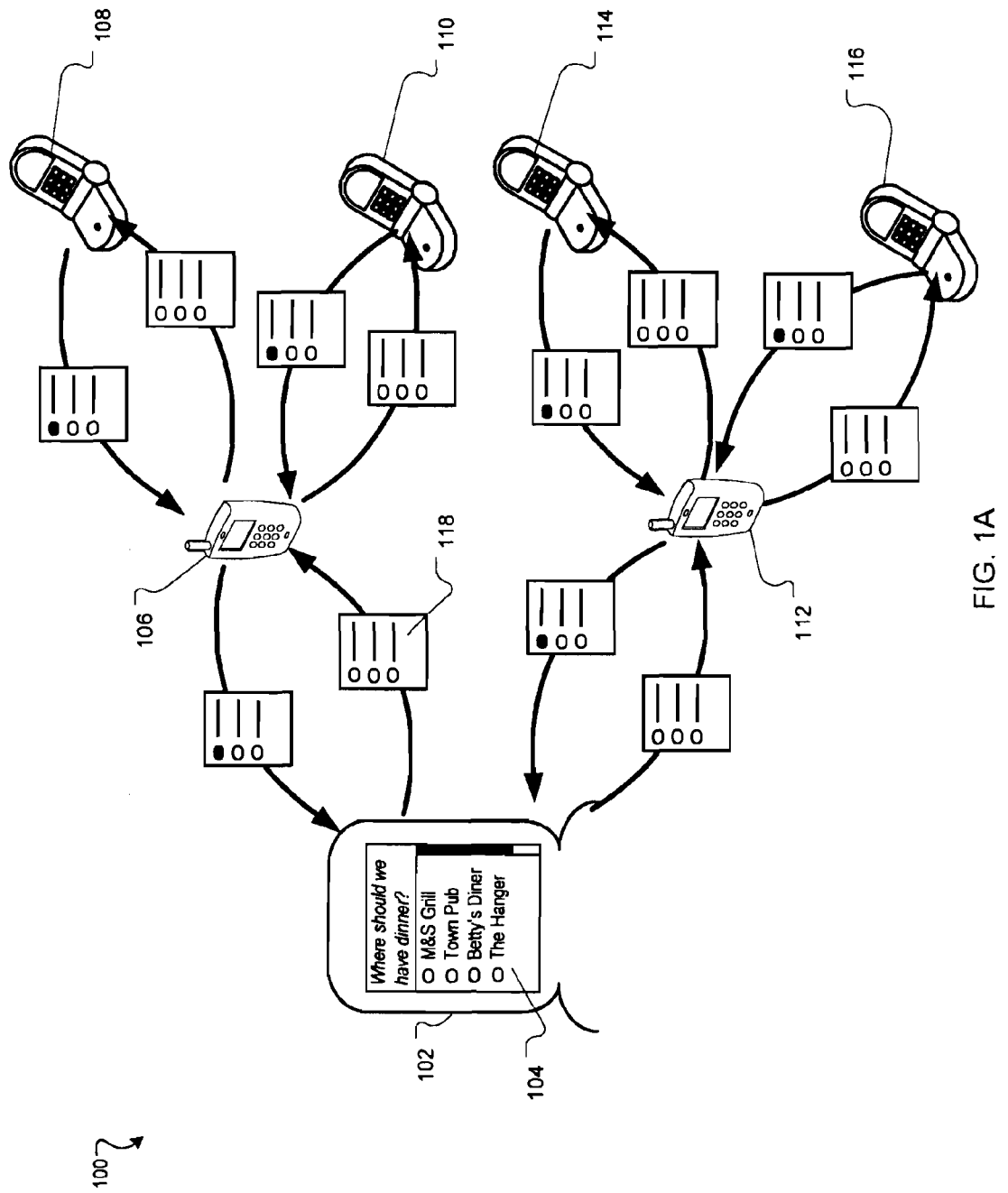
FIGS. 1A and 1B are conceptual diagrams of an example cost-effective voting system.

FIG. 1A shows a system 100 for creating and sending one or more messages using a voting application and receiving voting response messages in a cost-effective manner. A mobile device 102 can include a voting application. The mobile device 102 can be a cell phone, personal digital assistant (PDA), or other mobile device capable of sending and receiving messages. The voting application can also include a graphic user interface (GUI) 104 that can allow a user of the mobile device 102 to create a ballot for selecting among several options. For example, the user can create a ballot for voting on what activity people would like to do that evening. As shown in the example depicted, the user of the mobile device 102 can use the GUI 104 to create a ballot that can allow a group of people to vote on where to have dinner.

In some implementations, the voting application can access a contacts list associated with the mobile device 102. The user can select contacts to receive the ballot from the contacts list. In some implementations, in addition to or in place of selecting contacts from a contacts list, the user can manually enter contacts to receive the ballot. For example, the user can select three contacts from a contact list stored on the mobile device 102, and manually enter a phone number for a fourth person. Each contact, whether entered manually or selected from a contacts list, can be associated with a mobile device.

In some implementations, the voting application can separate mobile devices associated with contacts into voting groups. In the example depicted, the user has selected six contacts to receive the ballot. The voting application has divided recipient devices associated with the selected contacts into two voting groups, with mobile devices 106, 108, and 110 in a first group and mobile devices 112, 114, and 116 in a second group. In some implementations, the voting application can separate recipient devices into more than two groups. In some implementations, the voting application can separate recipient devices into uneven voting groups, with one group having more recipient devices than another.

The voting application can select a voting coordinator for each voting group. In the example depicted, the voting application has selected the mobile device 106 as the voting coordinator for the first group and the mobile device 112 as the voting coordinator for the second group. In some implementations, the voting application can select voting coordinators randomly. In some implementations, the voting application can select voting coordinators based on past selections of voting coordinators. For example, a voting group may include first and second mobile devices. If the first mobile device has been selected as a voting coordinator during a previous voting coordinator selection process, the voting coordinator can select the second mobile device as a voting coordinator for the current voting coordinator selection process. As another example, a voting group may include first, second, and third mobile devices. The first mobile device may have been previously selected as a voting coordinator five times. The second mobile device may have been previously selected as a voting coordinator three times. The third mobile device may have been previously selected as a voting coordinator eight times. In this example, the second mobile device can be selected as a voting coordinator for the voting group since it has been previously selected as a voting coordinator the least number of times.

In some implementations, the voting application can select voting coordinators based on the messaging plans of the mobile devices in a voting group. For example, a voting group can include a first mobile device with a messaging plan of 500 messages per month, a second mobile device with a messaging plan of 300 messages per month, and a third mobile device with a messaging plan of 1,000 messages per month. The voting application can select the third mobile device as a voting coordinator for the voting group since the third mobile device has a messaging plan that includes more messages than the other mobile devices in the voting group. In some implementations, the voting application can select voting coordinators based on the number of messages that each mobile device in a voting group has available. For example, a voting group can include first, second, and third mobile devices. The first mobile device may have 130 messages left for the month. The second mobile device may have 20 messages left for the month. The third mobile device may have 87 messages left for the month. The voting application can select the first mobile device as a voting coordinator for the voting group since the first mobile device has more messages left to use in the current month than the other mobile devices in the group.

In some implementations, the voting application can select voting coordinators based on one or more relationships between recipients of a ballot. For example, the users of mobile devices in a voting group may all be co-workers. One of the users may be the head of a department. The mobile device belonging to the head of the department may be selected as a voting coordinator since the other recipients may be more willing to view and respond to a message received from the head of the department than a message received from a co-worker.

In some implementations, the voting application can select voting coordinators based on a cost associated with sending a message for each mobile device. For example, a voting group may include first, second, and third mobile devices. The first mobile device may have to pay a fee of $0.10 for each message sent. The second mobile device may have to pay a fee of $0.12 for each message sent. The third mobile device may have to pay a fee of $0.07 for each message sent. The voting application may select the third mobile device as a voting coordinator for the voting group since the third mobile device pays a lower fee for sending messages than the other mobile devices in the voting group. In some implementations, the voting application can separate the voting groups into subgroups and select a subgroup voting coordinator for each subgroup.

The voting application can create voting inquiry messages that include the ballot to send to the voting coordinators. In addition to the ballot, the voting inquiry messages can include forwarding instructions. The forwarding instructions can indicate to the voting coordinators that the ballot should be forwarded to one or more other mobile devices. For example, the mobile device 102 can create a voting inquiry message 118 to send to the mobile device 106. The voting inquiry message 118 can include the ballot and forwarding instructions instructing the mobile device 106 to forward the ballot to the mobile devices 108 and 110. In some implementations, the forwarding instructions can instruct a voting coordinator to forward the ballot and additional forwarding instructions to one or more subgroup voting coordinators. The forwarding instructions can indicate subgroup voting coordinators and other subgroup members to allow the voting coordinator to create forwarding instructions for one or more subgroup voting coordinators. In some implementations, the forwarding instructions can instruct a voting coordinator to wait for one or more response messages containing user ballot selections. In some implementations, the forwarding instructions can instruct a voting coordinator to compile the user ballot selections contained in one or more response messages with a ballot selection made by a user of the voting coordinator device into a single response message. The forwarding instructions can instruct the voting coordinator to send the single response message to a mobile device that sent the voting inquiry message that included the forwarding instructions.

The mobile device 102 can send a voting inquiry message to the voting coordinators. In some implementations, the mobile device 102 can send the voting inquiry messages as text messages using Short Message Service (SMS) protocol. The voting application can present the received ballot to the user of the mobile device 102 and may allow the user to select one of the options from the ballot.

The mobile device 106 and the mobile device 112, acting as voting coordinators, can each receive a voting inquiry message that includes the ballot from the mobile device 102. For example, the mobile device 106 can receive the voting inquiry message 118. A voting application running on the mobile device 106 can determine that the voting inquiry message 118 includes forwarding instructions and extract the forwarding instructions from the voting inquiry message 118. The forwarding instructions can indicate additional mobile devices to which the mobile device 106 should forward the ballot. Additionally, the forwarding instructions can indicate if one or more of the additional mobile devices are subgroup voting coordinators and indicate forwarding instructions that should be sent to the subgroup voting coordinators. In the example depicted, the forwarding instructions included in the voting inquiry message 118 can indicate that the mobile device 106 should forward the ballot to the mobile devices 108 and 110. The mobile device 106 can create voting inquiry messages to send to the mobile devices 108 and 110 that include the ballot. The mobile device 106 can then send the voting inquiry messages to the mobile devices 108 and 110.

In some implementations, a voting coordinator for a voting group may separate the remaining mobile devices in the voting group into one or more subgroups and select subgroup voting coordinators for each of the subgroups. For example, a voting group can include a total of five mobile devices. A voting coordinator for the voting group can separate the other four mobile devices in the voting group into to subgroups of two devices each. The voting coordinator can select a subgroup voting coordinator for each subgroup. The voting coordinator can send a voting inquiry message that includes the ballot and additional forwarding instructions to one or more of the subgroup voting coordinators.

The mobile device 106 can present a received ballot to a user. The voting application running on the mobile device 106 can include a GUI that allows the user to select one of the options presented as part of the ballot. In some implementations, the voting application can wait to receive responses from the mobile devices 108 and 110 after the user of the mobile device 106 has selected one of the presented options.

The mobile devices 108 and 110 can receive the forwarded voting inquiry messages from the mobile device 106. A voting application running on each of the mobile devices 108 and 110 can present the ballot to a user of each of the mobile devices. Each user can then vote for one of the options presented in the ballot and the mobile devices 108 and 110 can send response messages that include the users' selections to the mobile device 106. For example, the mobile device 108 can receive a voting inquiry message that includes a ballot from the mobile device 106. A voting application running on the mobile device 108 can present the ballot to a user. The ballot can provide several options for a restaurant to have dinner. The user can select one of the restaurants, and the mobile device 108 can send a response message to the mobile device 106 indicating the user's selection.

In another example, the mobile device 108 may be a subgroup voting coordinator for a subgroup. In this example, the mobile device 108 can send voting inquiry messages including the ballot to one or more other mobile devices as directed by forwarding instructions received from the mobile device 106. The mobile device 108 can present the ballot to a user and allow the user to make a selection. The mobile device 108 can wait for responses from the mobile devices to which the mobile device 108 had forwarded the ballot. The mobile device 108 can send a response message to the mobile device 106 that includes the selection of the user of the mobile device 108 and the selections of users of the mobile devices to which the mobile device 108 had forwarded the ballot.

The mobile device 106 can receive response messages from the mobile devices 108 and 110. In some implementations, a voting coordinator will only receive response messages from mobile devices to which the voting coordinator sent a voting inquiry message. For example, in some implementations, the mobile device 106 will only receive response messages from the mobile devices 108 and 110. In some implementations, a mobile device will only send a response message to a device that sent an voting inquiry message to the mobile device. For example, in some implementations, the mobile device 108 will only send a response message to the mobile device 106 in response to receiving a voting inquiry message from the mobile device 106.

The voting application running on the mobile device 106 can compile selections indicated in one or more response messages with a selection made by a user of the mobile device 106 into a single response message and send the single response message to the mobile device 102. For example, the ballot may present several options for restaurants as depicted. A user of the mobile device 108 can select M&S Grill, a user of the mobile device 110 can select Betty's Diner, and a user of the mobile device 106 can also select Betty's Diner. The mobile device 108 can send a response message to the mobile device 106 indicating M&S Grill and the mobile device 110 can send a response message to the mobile device 106 indicating Betty's Diner. The voting application running on the mobile device 106 can create a single response message indicating one vote for M&S Grill and two votes for Betty's Diner and send the single response message to the mobile device 102.

The mobile device 112 can forward the ballot to the mobile devices 114 and 116, receive response messages from the mobile devices 114 and 116, and compile the results in the same manner as described above. The mobile device 112 can send a single response to the mobile device 102 indicating the selections of users of the mobile devices 112, 114, and 116.

The mobile device 102 can receive response messages from the voting coordinator mobile devices 106 and 112 and tabulate the response messages to determine which option has won the voting. The voting application running on the mobile device 102 can determine the winner based on selections indicated in the response messages as well as a selection made by the user of the mobile device 102. The mobile device 102 can indicate the winning selection to the other mobile devices in the system 100.

In some implementations, a mobile device associated with a contact selected or input by the user of the mobile device 102 may have an unlimited messaging plan. For example, the mobile device 112 may be associated with a text message plan that allows the mobile device 112 to send an unlimited number of SMS text messages per month.

The mobile device 102 can select a mobile device with the unlimited messaging plan as a lone voting coordinator. The mobile device 102 can send a voting inquiry message including a ballot and forwarding instructions to the lone voting coordinator. The forwarding instructions can direct the lone voting coordinator to send voting inquiry message that include the ballot directly to all of the other mobile devices that have been selected to receive the ballot. For example, the mobile device 112 may be associated with an unlimited messaging plan. The mobile device 102 can select the mobile device 112 as a lone voting coordinator. The mobile device 102 can send a voting inquiry message to the mobile device 112 that includes a ballot and forwarding instructions directing the mobile device 112 to send voting inquiry messages that include the ballot to the rest of the mobile devices. Upon receiving the voting inquiry message, the mobile device 112 can send voting inquiry messages including the ballot directly to each of the mobile devices 106, 108, 110, 114, and 116. Since the lone voting coordinator device is associated with an unlimited messaging plan, the lone voting coordinator does not incur extra charges for sending messages to the rest of the recipient mobile devices.

In some implementations, the mobile device 102 can send a voting inquiry message to a lone voting coordinator that indicates a ballot option selected by the user of the mobile device 102 along with the ballot and forwarding instructions. This can allow the lone vote coordinator to tabulate the votes once responses are received from one or more recipient mobile devices and send results messages to the mobile devices, including the mobile device 102, rather than compiling the selections of the other recipient mobile devices and sending a response message to the mobile device 102 that indicates all of the selections. In some implementations, the lone voting coordinator can compile all of the votes received from the other mobile devices along with the vote of a user of the lone voting coordinator into a single response message and forward the single response message to the mobile device 102.

In some implementations, one or more of the recipient mobile devices may not have a voting application installed that is needed for interpreting forwarding instructions and displaying a ballot. For example, the mobile device 106 may not have a voting application installed. When the mobile device 106 receives a voting inquiry message that includes a ballot and forwarding instructions from the mobile device 102, the voting inquiry message may include instructions on how to access and install a voting application for interpreting forwarding instructions and displaying a ballot. The user of the mobile device 106 can choose whether or not to install the voting application. If the user chooses to install the voting application, the voting application can access the previously received voting inquiry message, display the ballot to the user, and follow any forwarding instructions included in the voting inquiry message.

In some implementations, a mobile device may not be capable of accessing and installing the voting application. This may be because the mobile device is an older model mobile device and is not capable of running the voting application software. If a mobile device does not have, or is incapable of running the voting application, a voting inquiry message received by the mobile device can be presented to the user of the mobile device in a user readable format. In some implementations, the user can respond to the voting inquiry message with a standard message, such as a text message. For example, the mobile device 112 may not be able to run the voting application. The user of the mobile device can indicate a selection by typing in the selection and sending the selection as a text message. A voting application running on the mobile device 102 can recognize that the mobile device 112 has responded with a standard text message instead of a response message formatted to interact with the voting application. The mobile device 102 can select a different voting coordinator for the voting group that includes the mobile device 112 to ensure that the ballot reaches all of the intended recipient mobile devices in the voting group. In some implementations, the voting application running on the mobile device 102 can parse the text response from the mobile device 112 to extract the user's selection from the text message and incorporate the selection with results received from other mobile devices.

In some implementations, a time limit can be specified in a voting inquiry message. For example, the mobile device 102 can indicate in the voting inquiry message 118 that mobile device 106, acting as a voting coordinator, should wait no more than 30 minutes for response messages from the mobile devices 108 and 110. In this example, if the mobile device 108 is not on or does not receive a voting inquiry message, or if the user of the mobile device 108 chooses to ignore the voting inquiry message, the selections made by the users of the mobile devices 106 and 110 can still be propagated back to the mobile device 102 and tabulated to determine a winning selection.

In some implementations, the time limit can be automatically set by the voting software based on a time of an event or activity indicated in the ballot. For example, a ballot can include the text "Dinner at 8:00, where should we go?" If the current time is 6:00 pm, the voting application can set a time limit of 60 minutes so that a winning option can be selected an hour before dinner to allow the recipients of the ballot adequate time to prepare for dinner. In some implementations, the user of the mobile device 102 can manually indicate a time limit.

In some implementations, if the mobile device 102 does not receive a response from a voting coordinator within a specified time, the mobile device 102 can select another mobile device from the same voting group as a new voting coordinator. This ensures that the ballot is sent to all of the intended recipients. For example, the mobile device 102 may initially select the mobile device 106 as a voting coordinator and send a voting inquiry message that includes a ballot and forwarding instructions to the mobile device 106. The mobile device 106 may be turned off, out of service range, or have voting software disabled. If the mobile device 102 does not receive a response from the mobile device 106 within a specified time, the mobile device 102 can select the mobile device 108 as a new voting coordinator for the voting group. The mobile device 102 can send a voting inquiry message that includes the ballot and forwarding instructions to the mobile device 108. The forwarding instructions can direct the mobile device 108 to forward the ballot to the mobile device 110. The specified time can be set in a manner as described above.

In some implementations, a recipient mobile device can include additional information in a response message that includes a vote of a user of the recipient mobile device. The additional information can include details of a messaging plan associated with the recipient mobile device. For example, the mobile device 106 can send a response message to the mobile device 102 that indicates that the mobile device 106 has a messaging plan that allows for 1,000 messages to be sent in a month. In another example, the mobile device 108 can send a response message to the mobile device 106 that indicates that the mobile device 106 has 27 messages available to use for the remainder of the month.

Figure 1B:
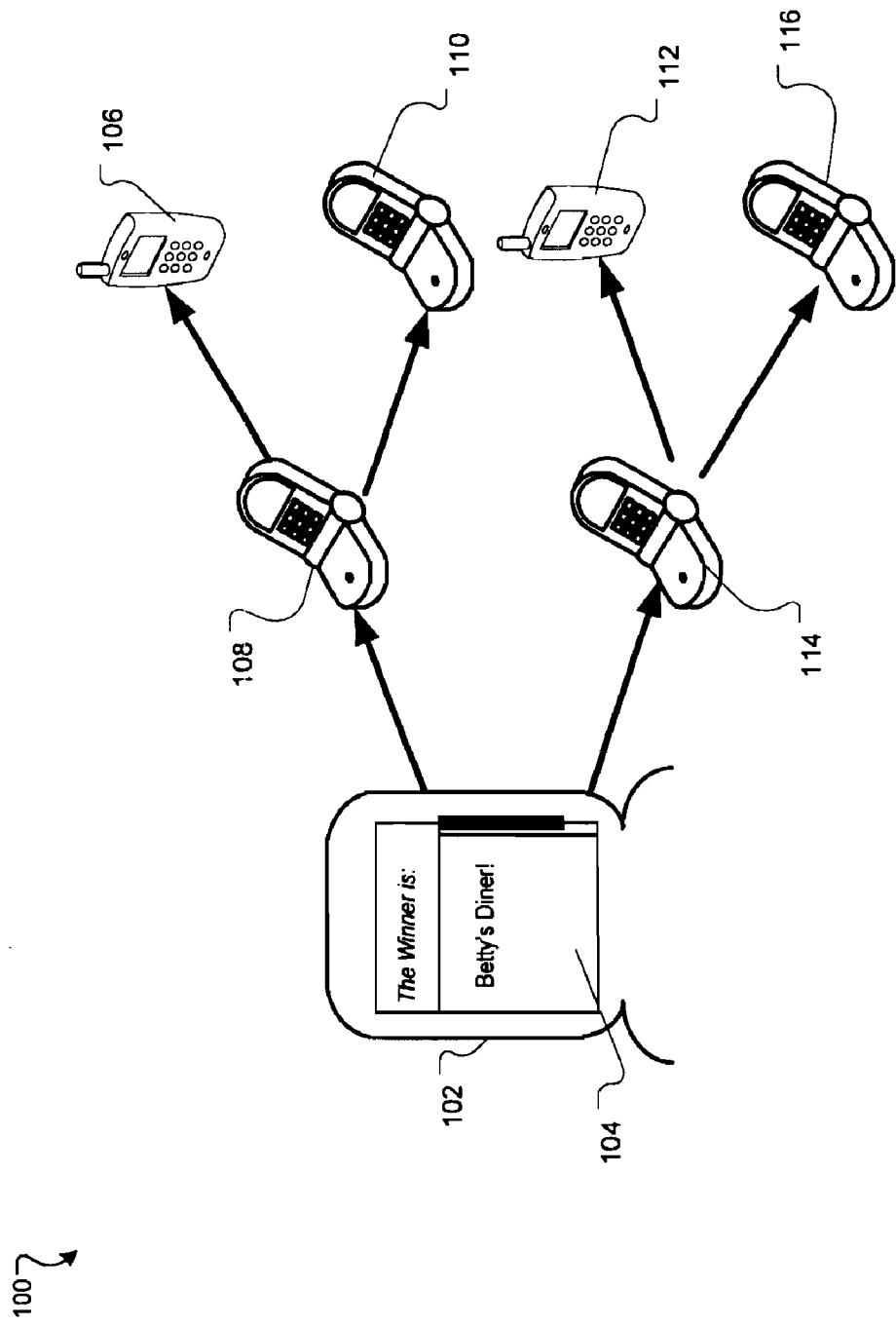

FIG. 1B shows the system 100 from FIG. 1A. In this figure, the system 100 is used as an example system for sending voting results to one or more mobile devices. The mobile device 102 can compile votes from the other mobile devices in the system 100 as well as a vote made by the user of the mobile device 102. The votes can be selections made by users of the mobile devices in the system 100 as described above. A voting application included in the mobile device 102 can tabulate the votes to select a winning option. For example, following the example depicted in FIGS. 1A and 1B, the voting application can determine that the winning option is Betty's Diner. The voting application can present the results of the vote to a user of the mobile device 102.

The mobile device 102 can propagate the results of the vote to the other mobile devices in the system 100. In some implementations, the mobile device 102 can select one or more new voting coordinators from each of the previously determined voting groups. For example, the voting application can select the mobile devices 108 and 114 as new voting coordinators. In some implementations, the voting application can determine one or more new voting groups and select one or more new voting coordinators from each of the new voting groups. For example, when sending out voting inquiry messages, a first group may have contained mobile devices that did not respond with voting response messages, possibly because the mobile devices were powered down or out of service range. The mobile device 102 can select new voting groups so that each of the new voting groups includes at least one mobile device that provided a response message in response to a voting inquiry message. One or more previously responsive devices from each of the new voting groups can be selected as a new voting coordinator. This can increase the probability that a results message is forwarded to all of the intended recipient mobile devices.

In some implementations, the voting application running on the mobile device 102 can verify that the new voting coordinators have the voting application installed and responded to the originally sent voting inquiry. For example, if the mobile device did not send a response message in response to a voting inquiry message, the mobile device 102 can avoid selecting the mobile device 110 as a new voting coordinator for the first voting group. In another example, the mobile device 116 may have responded to a voting inquiry message with a standard text message, indicating that the mobile device does not have a voting application installed. The mobile device 102 can avoid selecting the mobile device 116 as a new voting coordinator for the second voting group because the mobile device 116 may not have the ability to interpret and execute forwarding instructions. Verifying that new voting coordinators have the voting application installed and responded to the originally sent voting inquiry message can increase the probability that a results message is forwarded to all of the intended recipient mobile devices.

The mobile device 102 can create a results message. The results message can include the results of the vote and forwarding instructions. The mobile device 102 can send the results message to the new voting coordinators. For example, the mobile device 102 can send a results message that includes forwarding instructions that indicates Betty's diner as the winning selection to the mobile device 108. The forwarding instructions can indicate that the mobile device 108 should forward the results to the mobile device 106 and the mobile device 110.

The new voting coordinators can receive a results message that includes voting results and forwarding instructions from the mobile device 102. A new voting coordinator can extract forwarding instructions from the results message and forward the results to additional mobile devices. For example, the mobile device 114 can extract forwarding instructions from a results message received from the mobile device 102. The forwarding instructions can indicate that the mobile device 114 should forward the results to the mobile devices 112 and 116. In some implementations the results message can include no forwarding instructions.

In some implementations, a new voting coordinator can define one or more subgroups and one or more subgroup voting coordinators. In some implementations, forwarding instructions included in a results message received by a new voting coordinator can specify one or more subgroups and one or more subgroup voting coordinators. The new voting coordinator can send a results message that includes the results and additional forwarding instructions to subgroup voting coordinators.

A new voting coordinator can present the results of the vote to a user of the new voting coordinator. Mobile devices that have received a results message from a new voting coordinator or subgroup voting coordinator can present the results of the vote to users.

By selecting a new voting coordinator for a voting group, the voting application can more evenly distribute the cost of sending messages among the mobile devices in the voting group. For example, following the example shown in FIGS. 1A and 1B, the mobile device 106 can be chosen as the original voting coordinator for the first voting group. As described previously, the mobile device 106 can send two voting inquiry messages to the mobile devices 108 and 110 and can send one response message that includes user selections to the mobile device 102, for a total of three messages. The mobile device 108 can be selected as a new voting coordinator for the first voting group. The mobile device 108 can send one response message to the mobile device 106 when the mobile device 106 is acting as the original voting coordinator. Additionally, the mobile device 108 can send two results messages to the mobile devices 106 and 110 when the mobile device 108 is acting as the new voting coordinator. In an implementation in which mobile devices are charged for each message sent, the users of the mobile devices 106 and 108 would each be charged for three messages in this example.

Comparing this example to an implementation in which the same mobile device is chosen as both the original and new voting coordinator demonstrates that the cost of propagating voting inquiry messages, response messages, and results messages among the mobile devices in a voting group can be more evenly distributed when a new voting coordinator is selected so as to be different from an originally selected voting coordinator. For example, in an implementation in which the same mobile device is chosen as both the original and new voting coordinator for a voting group that includes three mobile devices, the voting coordinator device sends a total of 5 messages while the other mobile devices in the voting group each send 1 message. This much less evenly distributes the cost of sending messages among mobile devices in a voting group than an implementation in which a new voting coordinator is selected so as to be different from an originally selected voting coordinator.

In the example depicted in FIGS. 1A and 1B, the mobile device 102 sends a total of four messages, the mobile devices 106, 108, 112 and 114 each send a total of three messages, and the mobile devices 110 and 116 each send one message. Additionally, the mobile device 102 receives a total of two messages, the mobile devices 106 and 112 each receive a total of four messages, and the mobile devices 108, 110, 114 and 116 each receive a total of two messages. In implementations in which the mobile devices in the system 100 incur a charge for each message sent and received, the above described process can more evenly distribute the cost of propagating voting inquiry messages, response messages, and results messages among the mobile devices. In an implementation in which the mobile device 102 sends voting inquiry messages and results messages directly to the recipient mobile devices in the system 100 and the recipient mobile devices send response messages directly to the mobile device 102, the mobile device 102 would send a total of 12 messages and receive a total of six messages while the recipient mobile devices would send a total of one message each and receive a total of two messages each.

Figure 2:
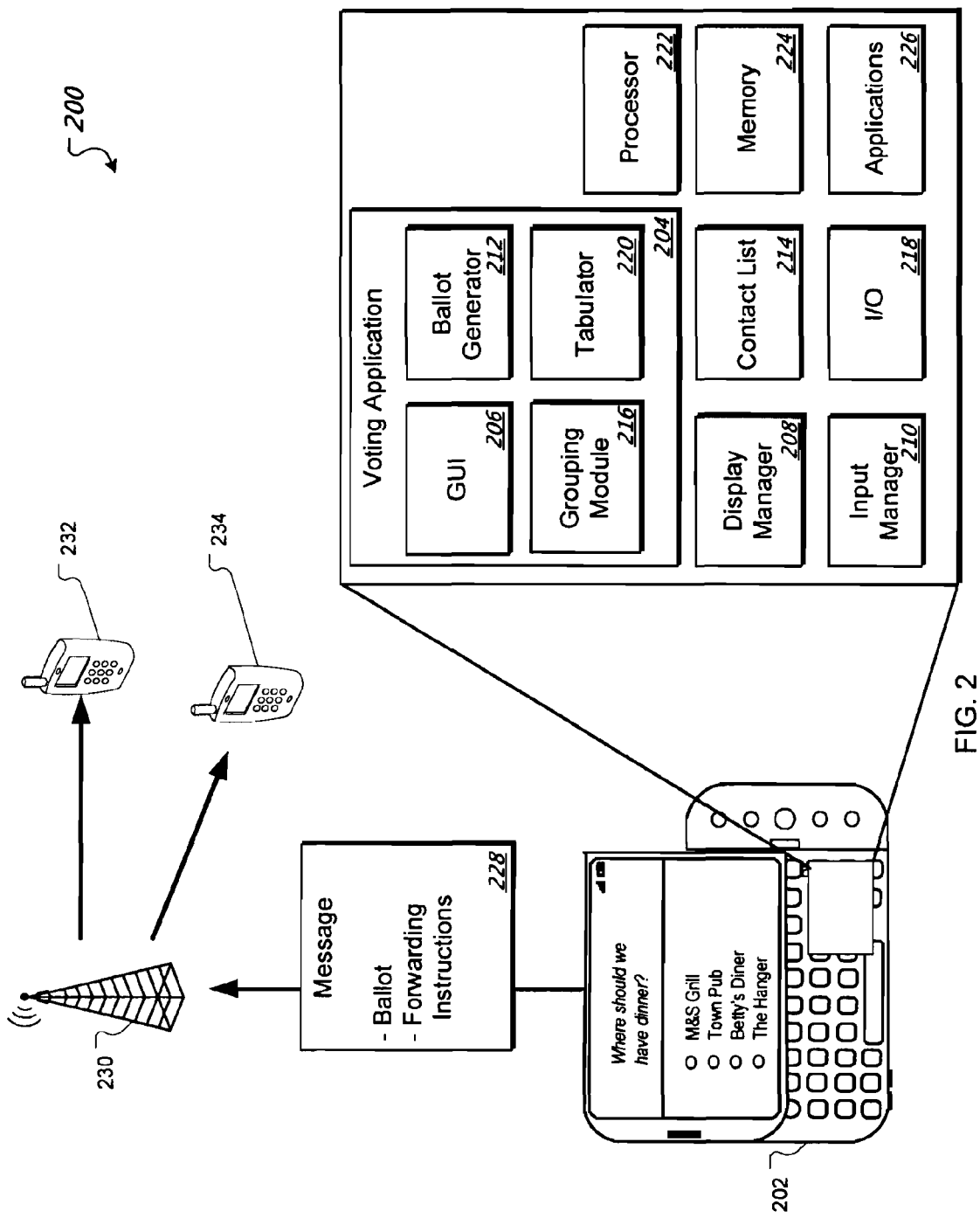
FIG. 2 illustrates an example block diagram of a cost-effective mobile voting system.

FIG. 2 illustrates an example block diagram of a cost-effective mobile voting system 200. A mobile device 202 can include a voting application 204 capable of creating and sending voting inquiry messages. The voting application 204 can include a GUI 206 capable of presenting information to a user of the mobile device 202 and receiving input from the user. The GUI 206 can interact with a display manager 208 of the mobile device 202 for displaying information to the user. The GUI 206 can also interact with an input manager 210 to receive input from the user, for example, through a keypad or touch screen.

The GUI 206 can allow the user to input information for creating a voting ballot. For example, the user can input a question, and input one or more options for others to choose from. The voting application 204 can include a ballot generator 212 for creating one or more ballots using information input by the user. The GUI 206 can display a ballot generated by the ballot generator 212 to the user and allow the user to vote by selecting an option listed as part of the ballot.

The voting application 204 can access a contact list 214 of the mobile device 202. The voting application 204 can allow the user to select one or more contacts from the contact list 214 to receive a ballot generated by the ballot generator 212. In some implementations, the voting application 204 can allow the user to manually input one or more contacts to receive a ballot. Each contact, whether selected from the contact list 214 or input manually by the user, can be associated with a recipient mobile device.

The voting application 204 can include a grouping module 216. The grouping module 216 can separate intended recipients into one or more voting groups as described above with reference to FIG. 1A. In some implementations, the grouping module 216 can separate voting groups into subgroups. The grouping module 216 can select one or more voting coordinators for a voting group. In some implementations, the grouping module 216 can select one or more subgroup voting coordinators for a sub group.

The voting application 204 can create a voting inquiry message that includes a ballot generated by the ballot generator 212 and forwarding instructions. The forwarding instructions can instruct voting coordinator mobile devices to forward the ballot to other mobile devices in a voting group. The voting application 204 can access an input/output interface 218 of the mobile device 202 to transmit the voting inquiry message to voting coordinator mobile devices. In some implementations, the voting inquiry message can be transmitted as an SMS text message. The voting application 204 can also access the input/output interface 218 to receive response messages.

The voting application 204 can include a tabulator 220 for determining a result of a vote. The tabulator can extract selections made by users of recipient mobile devices from response messages. The tabulator can also access a selection made by the user of the mobile device 202. The tabulator 220 can tabulate the selections to determine a winning selection. The voting application 204 can create a results message that indicates a winning selection as determined by the tabulator 220. The voting application 204 can access the input/output interface 218 to transmit the results message to recipient mobile devices.

The mobile device 202 can include a processor 222 for executing application code and performing instructions. The mobile device 202 can include memory 224 for storing the contact list 214, program code, user input, and other program data. The mobile device 202 can include additional applications 226 that can be related or unrelated to the voting application 204. For example, a photo application may allow a user of the mobile device 202 to include a photo or graphic in a ballot generated using the ballot generator 212. In another example, a web browser may allow the user to look up restaurants listed on a ballot and include web links in the ballot.

The mobile device 202 can transmit a voting inquiry message 228. The voting inquiry message 228 can include a ballot, for example, a ballot generated by the ballot generator 212. The ballot can include an inquiry and a number of options for users of recipient mobile devices to select. The voting inquiry message 228 can also include forwarding instructions. The forwarding instructions can instruct voting coordinator mobile devices to forward the ballot to other mobile devices in a voting group. The forwarding instructions can also include subgroup and subgroup voting coordinator information.

The voting inquiry message 228 can be received by a relay device 230 such as, for example, a cell phone tower. In some implementations, the relay device 230 can relay the voting inquiry message 228 to another relay device such as, for example, a second cell phone tower, or a satellite. The voting inquiry message 228 is transmitted to one or more recipient mobile devices via the relay device 230 or another relay device. For example, the relay device 230 can transmit the voting inquiry message 228 to mobile devices 232 and 234. In another example, the relay device 230 can transmit the voting inquiry message 228 to a satellite and the satellite can transmit the voting inquiry message to the mobile devices 232 and 234. The recipient mobile devices 232 and 234 can include similar components to those of the mobile device 202 such as a GUI, voting application, grouping module, I/O, input manager, display manager, etc.

Figure 3:
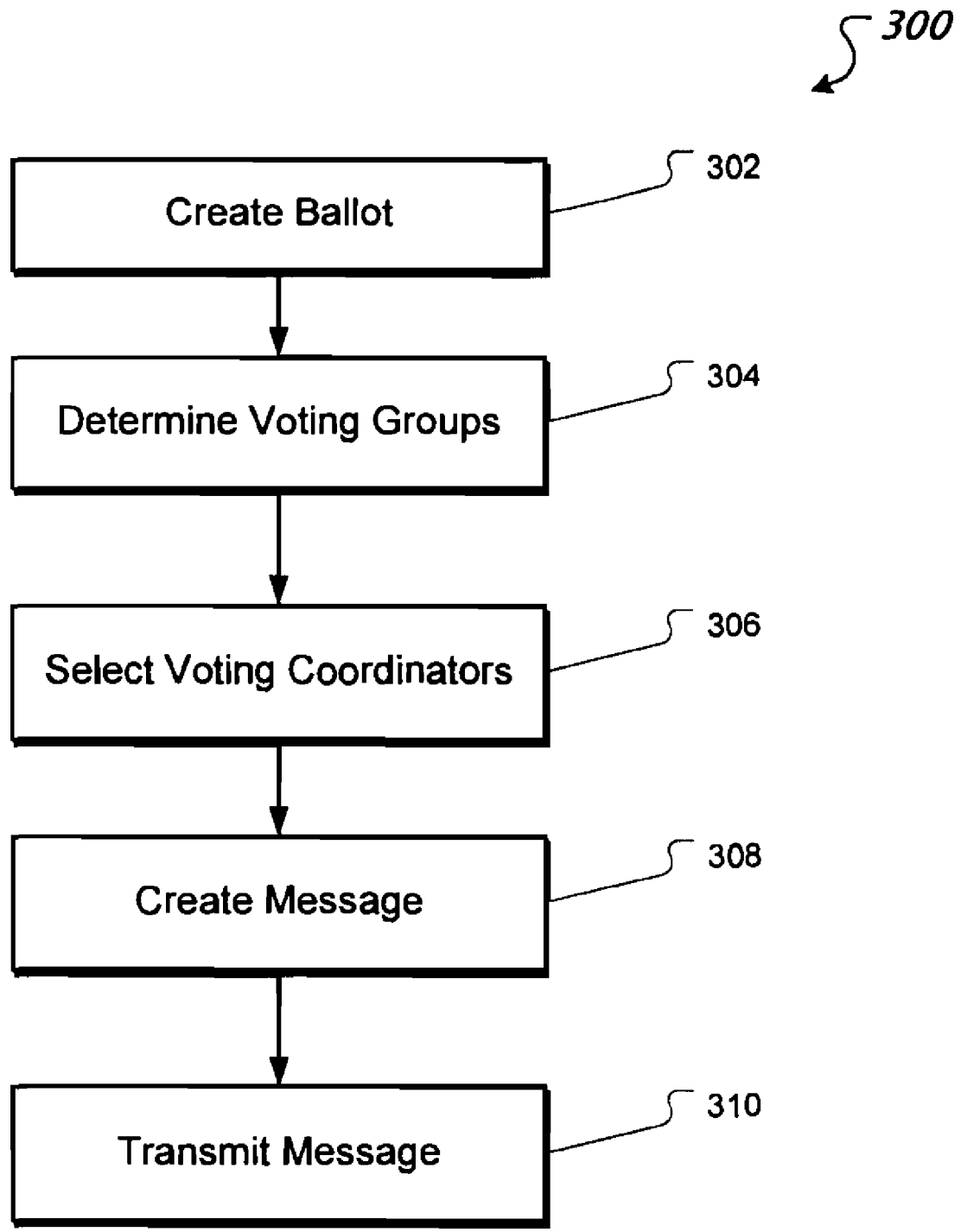
FIG. 3 shows an example flowchart of a process of transmitting ballots.

FIG. 3 shows an example flowchart of a process 300 of transmitting ballots. In some implementations, the process 300 can be performed by a processor executing instructions stored in a computer-readable medium, such as for example, the processor 222 shown in FIG. 2. In some implementations, the process 300 can be performed by a mobile device, such as for example, the mobile device 202 shown in FIG. 2.

A ballot can be created at step 302. The ballot can include an inquiry and one or more options that can be selected in response to the inquiry. For example, the ballot can include the inquiry "What time should we meet for racquet ball?" and several options, such as "10:00," "10:30," and "11:00." The ballot can be created based on input received from a user of a mobile device such as, for example, the mobile device 202 shown in FIG. 2.

Voting groups can be determined at step 304. A number of intended recipients of a message that includes the ballot can be separated into one or more voting groups. For example, eight intended recipient mobile devices can be separated into two voting groups, with each voting group including four of the intended recipient mobile devices. In some implementations, voting groups can be separated into subgroups.

A voting coordinator for each voting group can be selected at step 306. A voting coordinator device for a voting group can be selected using methods previously described with reference to FIG. 1A. In some implementations, it can be verified that a mobile device includes appropriate software for executing voting coordinator functionality before the mobile device is selected as a voting coordinator for a voting group. In some implementations, subgroup voting coordinators can be selected from subgroups.

A message can be created at step 308. For example, referring to FIG. 2, the mobile device 202 can create the message 228. The message can include the ballot created at stage 302 as well as forwarding instructions. The forwarding instructions can instruct voting coordinators selected at stage 306 to forward the ballot to other mobile devices in a voting group.

A message can be transmitted to the voting coordinators at step 310. For example, referring to FIG. 2, the mobile device 202 can use the input/output interface 218 to transmit the message 228 to the relay device 230. The relay device 230 can propagate the message 228 to the recipient mobile devices 232 and 234.

Figure 4:
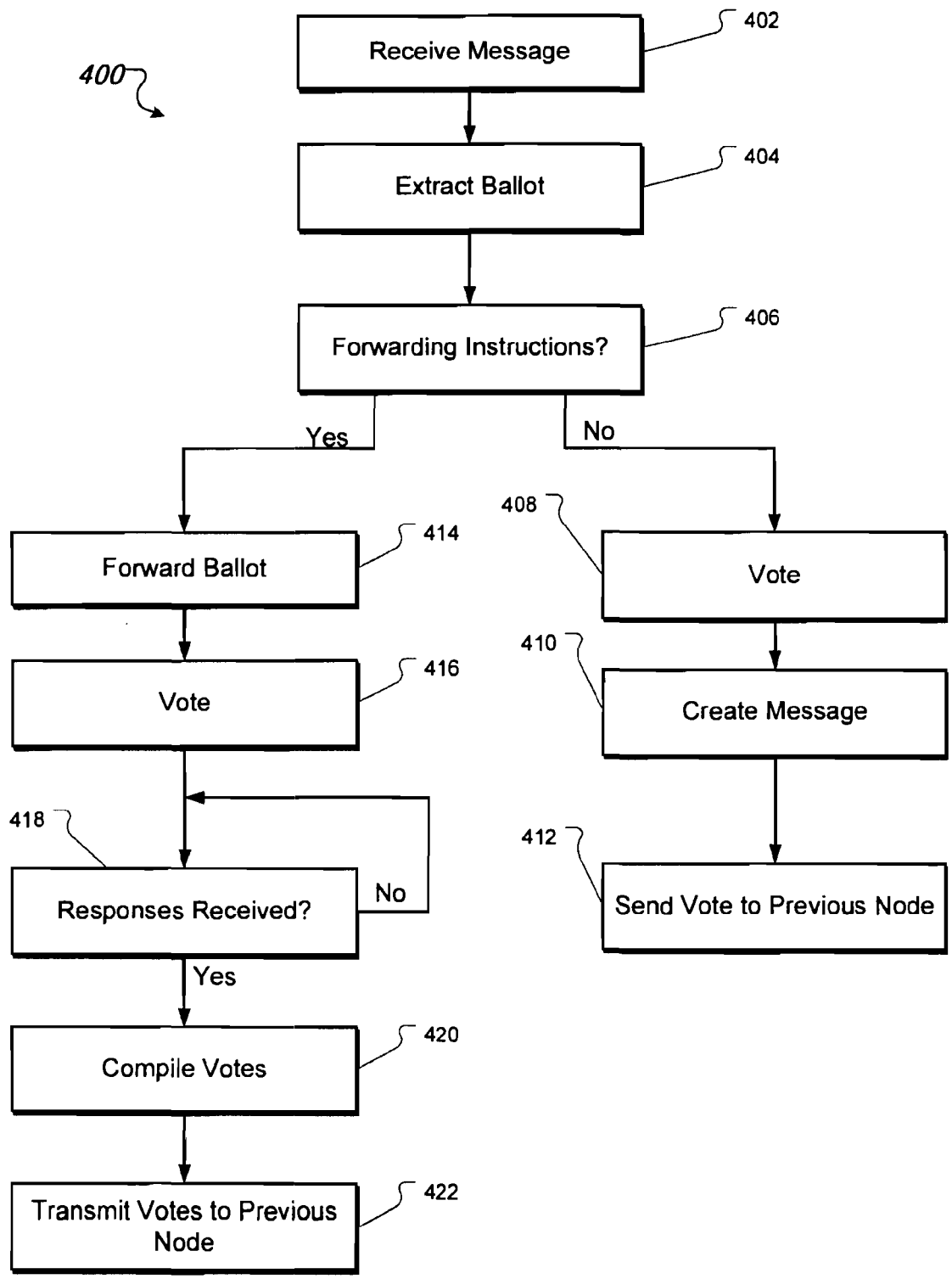
FIG. 4 shows an example flowchart of a process of transmitting votes.

FIG. 4 shows an example flowchart of a process 400 of transmitting votes. In some implementations, the process 400 can be performed by a processor executing instructions stored in a computer-readable medium, such as for example, the processor 222 shown in FIG. 2. In some implementations, the process 400 can be performed by a mobile device, such as for example, the mobile device 106 shown in FIG. 1A.

A message can be received at step 402. For example, referring to FIG. 1A, the mobile device 106 can receive the voting inquiry message 118. The message can include a ballot. In some implementations the message can include forwarding instructions.

A ballot can be extracted from the message at step 404. For example, referring to FIG. 1A, the mobile device 106 can extract a ballot created by the mobile device 102 from the message 118. The ballot can include an inquiry and one or more options that a user can select in response to the inquiry.

The message can be assessed to determine if forwarding instructions are included with the message at step 406. For example, a mobile device can include a voting application that can determine if a message includes forwarding instructions. The forwarding instructions can include telephone numbers, e-mail addresses, screen names, or other identifiers for one or more mobile devices to which the ballot should be forwarded. In some implementations, forwarding instructions can identify one or more subgroups and one or more subgroup voting coordinators. The forwarding instructions can indicate that a subgroup voting coordinator should receive additional forwarding instructions.

In some implementations, if, at step 406, it is determined that the message does not include forwarding instructions, a user can be allowed to vote at step 408. For example, a user can vote for an option in response to an inquiry included in the ballot. As another example, referring to FIG. 1A, the mobile device 108 can include a GUI capable of presenting the ballot to a user and receiving a selection from the user.

A response message can be created at step 410. The response message can indicate a selection made by the user. For example, referring to FIG. 1A, the mobile device 108 can create a response message that indicates a restaurant selected from the ballot by a user of the mobile device 106.

The response message can be sent to a previous nodes at step 412. For example, referring to FIG. 1A, the mobile device 108 can send a response message which includes a user selection to the mobile device 106. As another example, a mobile device can access an input/output interface, such as the input/output interface 218 shown in FIG. 2, to transmit a response message to a mobile device that transmitted the original message received at stage 402.

In some implementations, if, at step 406, it is determined that the message includes forwarding instructions, the ballot can be forwarded according to the forwarding instructions at step 414. For example, referring to FIG. 1A, the mobile device 106 can forward a ballot included in the message 118 to the mobile devices 108 and 110. In some implementations, the ballot can be forwarded in a message that includes additional forwarding instructions. In some implementations, at step 414, the group of devices that the ballot may be forwarded to can be further divided into subgroups, and the ballot can be forwarded to the voting coordinator in those subgroups in a message that includes additional forwarding instructions.

A user can be allowed to vote at step 416. For example, a user can vote for an option in response to an inquiry included in the ballot. As another example, referring to FIG. 1A, the mobile device 106 can include a GUI capable of presenting the ballot to a user and receiving a selection from the user.

It can be determined if response messages have been received from nodes to which the ballot was forwarded at step 418. For example, referring to FIG. 1A, the mobile device 106 can check if response messages have been received from the mobile devices 108 and 110. If response messages have not been received from all nodes to which the ballot was forwarded, step 418 can be repeated. If response messages have been received from all nodes to which the ballot was forwarded, the process 400 can continue to step 420. For example, referring to FIG. 1A, upon receiving response messages from the mobile devices 108 and 110, the mobile device 106 can continue with the process 400. In some implementations, if a specified time limit has been reached, process 400 can continue to step 420.

Votes can be compiled at step 420. Votes can be extracted from response messages received from nodes to which the ballot was forwarded. The votes extracted from response messages can be compiled together with the vote received from the user at Stage 416 into a single message. For example, in response to an inquiry for a time to meet, a mobile device can receive a first response message indicating a vote for "10:00" and a second response message indicating a vote for "11:00". A user of the mobile device can input a vote for "10:00". The mobile device can compile the votes and create a message that indicates two votes for "10:00" and one vote for "11:00".

Voting response messages can be transmitted to a previous node at step 422. For example, referring to FIG. 1A, the mobile device 106 can transmit a message to the mobile device 102 that indicates votes made by users of the mobile devices 106, 108, and 110.

Figure 5:
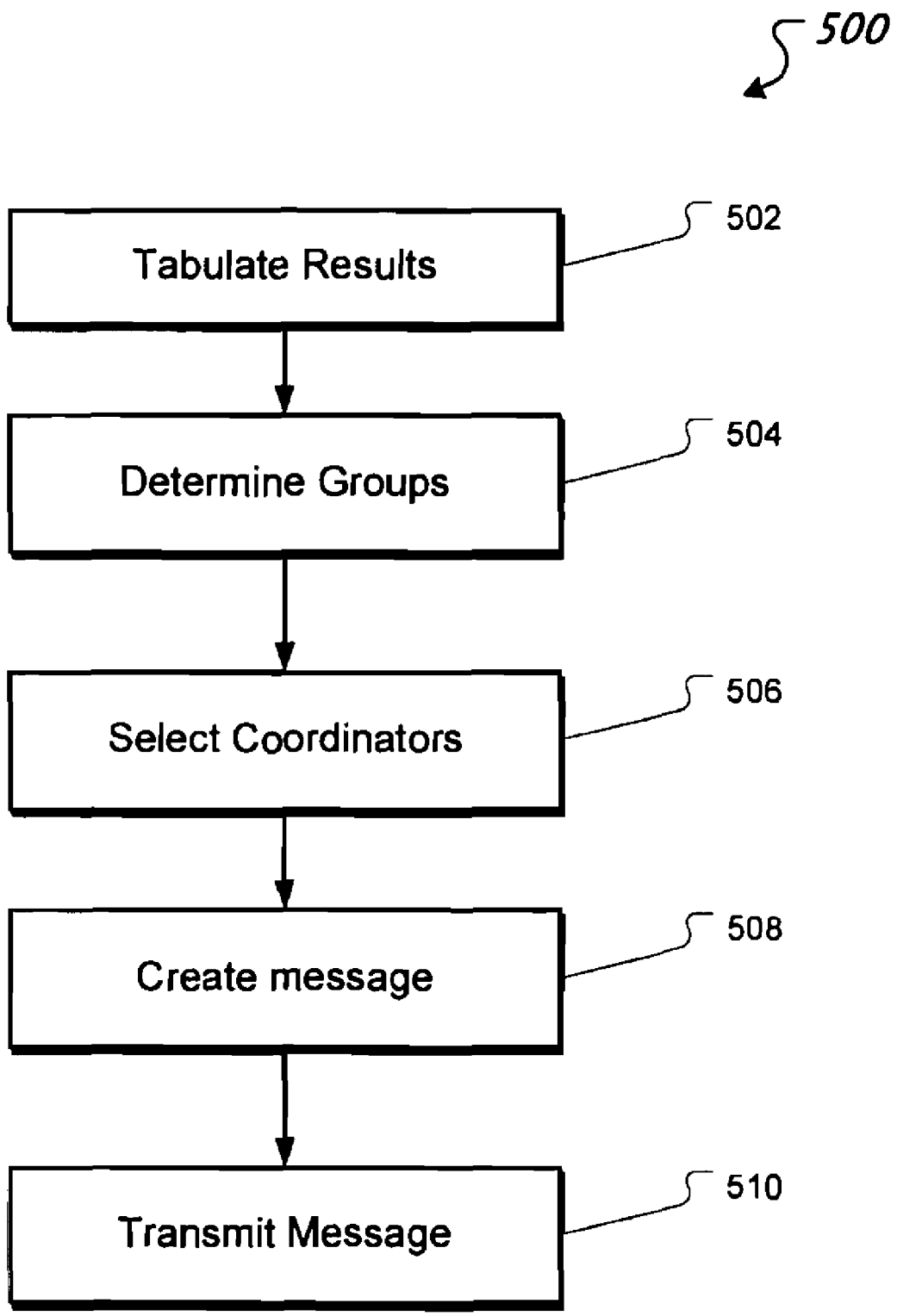
FIG. 5 shows an example flowchart of a method of distributing voting results.

FIG. 5 shows an example flowchart of a method 500 of distributing voting results. In some implementations, the method 500 can be performed by a processor executing instructions stored in a computer-readable medium, such as for example, the processor 222 shown in FIG. 2. In some implementations, the method 500 can be performed by a mobile device, such as for example, the mobile device 202 shown in FIG. 2.

Voting results can be received and tabulated at step 502. For example, referring to FIG. 1A, the mobile device 102 can receive response messages from the mobile devices 106 and 112. The response message received from the mobile device 106 can include votes from users of the mobile devices 106, 108, and 110. The response message received from the mobile device 112 can include votes from users of the mobile devices 112, 114, and 116. The mobile device 102 can tabulate the votes received in the response messages along with a vote of a user of the mobile device 102 to determine a winning selection of a vote.

Groups for transmitting voting results can be determined at step 504. For example, a mobile device an separate six recipient mobile devices into two groups with each group including three mobile devices. In some implementations, groups for transmitting voting results can be the same as voting groups determined as part of a process for transmitting ballots, such as the process 300 shown in FIG. 3.

Voting coordinators for each group can be selected at step 506. For example, referring to FIG. 1B, the mobile device 102 can select the mobile device 108 as a voting coordinator of a first group of mobile devices. The mobile device 102 can select the mobile device 114 as a voting coordinator of a second group of mobile devices. In some implementations, a voting coordinator for a group can be selected so as to be different from a voting coordinator selected as part of a process for transmitting ballots, such as the process 300 shown in FIG. 3.

A results message can be created at step 508. The results message can indicate a winning selection of a vote as determined at Stage 502. For example, referring to FIG. 1B, the mobile device 102 can create a results message indicating Betty's Diner as the winning selection of a vote. Additionally, the results message can include forwarding instructions. The forwarding instructions can instruct voting coordinators selected at stage 506 to forward the ballot to other mobile devices in a voting group.

The results message can be transmitted to the voting coordinators at step 510. For example, referring to FIG. 1B, the mobile device 102 can transmit the results message to the mobile devices 108 and 114. As another example, referring to FIG. 2, the mobile device 202 can use the input/output interface 218 to transmit a results message.

Figure 6:
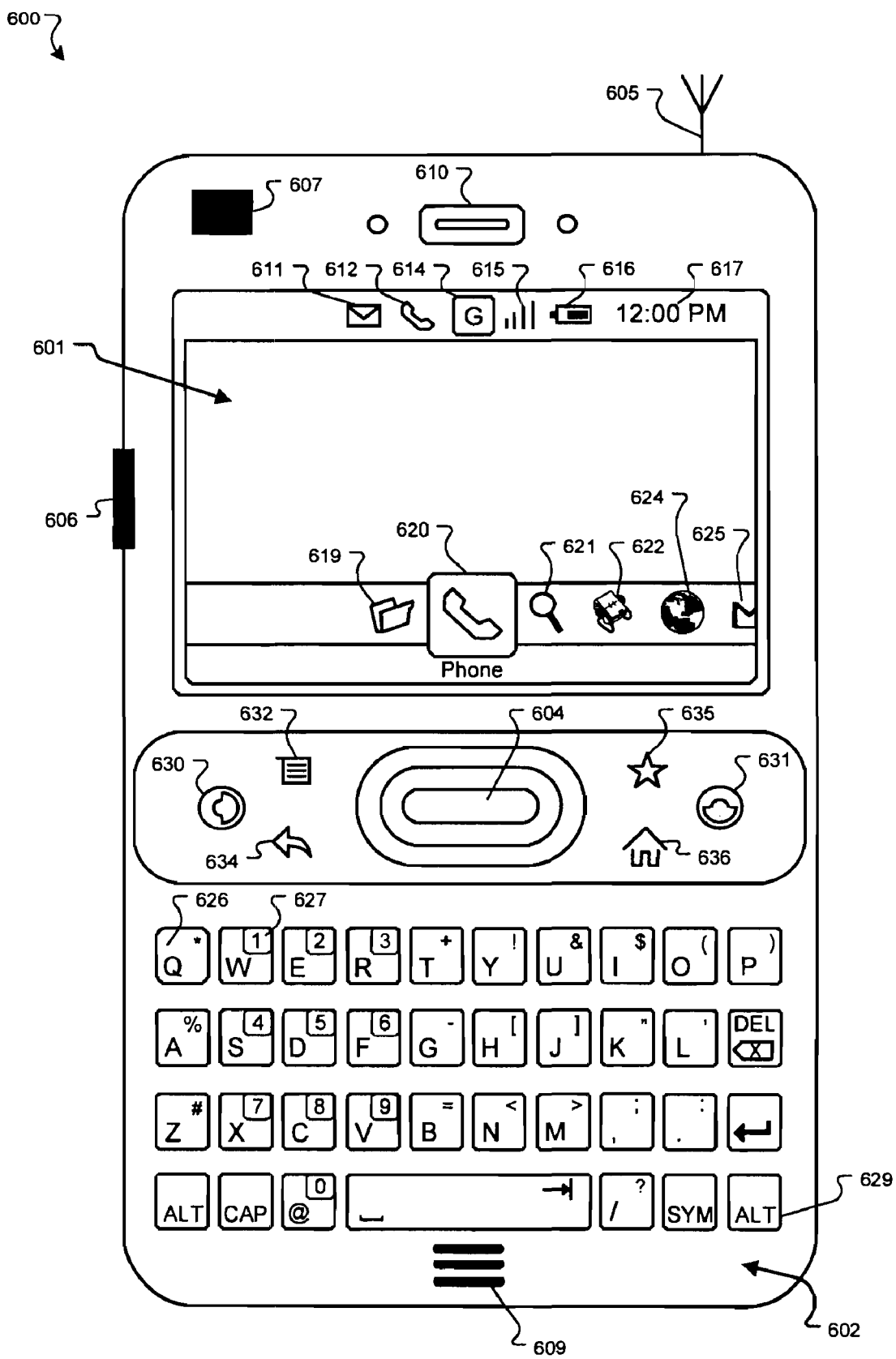
FIG. 6 is a schematic representation of an exemplary mobile device that can be used to implement the techniques described herein.

Referring now to FIG. 6, the exterior appearance of an exemplary device 600 that implements the cost-effective voting system and method is illustrated. Briefly, and among other things, the device 600 includes a processor configured to create and transmit a ballot that includes a voting inquiry upon request of a user of the mobile device.

In more detail, the hardware environment of the device 600 includes a display 601 for displaying text, images, and video to a user; a keyboard 602 for entering text data and user commands into the device 600; a pointing device 604 for pointing, selecting, and adjusting objects displayed on the display 601; an antenna 605; a network connection 606; a camera 607; a microphone 609; and a speaker 610. Although the device 600 shows an external antenna 605, the device 600 can include an internal antenna, which is not visible to the user.

The display 601 can display video, graphics, images, and text that make up the user interface for the software applications used by the device 600, and the operating system programs used to operate the device 600. Among the possible elements that may be displayed on the display 601 are a new mail indicator 611 that alerts a user to the presence of a new message; an active call indicator 612 that indicates that a telephone call is being received, placed, or is occurring; a data standard indicator 614 that indicates the data standard currently being used by the device 600 to transmit and receive data; a signal strength indicator 615 that indicates a measurement of the strength of a signal received by via the antenna 605, such as by using signal strength bars; a battery life indicator 616 that indicates a measurement of the remaining battery life; or a clock 617 that outputs the current time.

The display 601 may also show application icons representing various applications available to the user, such as a web browser application icon 619, a phone application icon 620, a search application icon 621, a contacts application icon 622, a mapping application icon 624, an email application icon 625, or other application icons. In one example implementation, the display 601 is a quarter video graphics array (QVGA) thin film transistor (TFT) liquid crystal display (LCD), capable of 16-bit or better color.

A user uses the keyboard (or "keypad") 602 to enter commands and data to operate and control the operating system and applications that provide for the creation and transmission of a ballot that includes a voting inquiry. The keyboard 602 includes standard keyboard buttons or keys associated with alphanumeric characters, such as keys 626 and 627 that are associated with the alphanumeric characters "Q" and "W" when selected alone, or are associated with the characters "*" and "1" when pressed in combination with key 629. A single key may also be associated with special characters or functions, including unlabeled functions, based upon the state of the operating system or applications invoked by the operating system. For example, when an application calls for the input of a numeric character, a selection of the key 627 alone may cause a "1" to be input.

In addition to keys traditionally associated with an alphanumeric keypad, the keyboard 602 also includes other special function keys, such as an establish call key 630 that causes a received call to be answered or a new call to be originated; a terminate call key 631 that causes the termination of an active call; a drop down menu key 632 that causes a menu to appear within the display 601; a backward navigation key 634 that causes a previously accessed network address to be accessed again; a favorites key 635 that causes an active web page to be placed in a bookmarks folder of favorite sites, or causes a bookmarks folder to appear; a home page key 636 that causes an application invoked on the device 600 to navigate to a predetermined network address; or other keys that provide for multiple-way navigation, application selection, and power and volume control.

The user uses the pointing device 604 to select and adjust graphics and text objects displayed on the display 601 as part of the interaction with and control of the device 600 and the applications invoked on the device 600. The pointing device 604 is any appropriate type of pointing device, and may be a joystick, a trackball, a touch-pad, a camera, a voice input device, a touch screen device implemented in combination with the display 601, or any other input device.

The antenna 605, which can be an external antenna or an internal antenna, is a directional or omni-directional antenna used for the transmission and reception of radiofrequency (RF) signals that implement point-to-point radio communication, wireless local area network (LAN) communication, or location determination. The antenna 605 may facilitate point-to-point radio communication using the Specialized Mobile Radio (SMR), cellular, or Personal Communication Service (PCS) frequency bands, and may implement the transmission of data using any number or data standards. For example, the antenna 605 may allow data to be transmitted between the device 600 and a base station using technologies such as Wireless Broadband (WiBro), Worldwide Interoperability for Microwave ACCess (WiMAX), 6GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only)(EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with an QUALCOMM RTR6285™ transceiver and PM7540™ power management circuit.

The wireless or wired computer network connection 606 may be a modem connection, a local-area network (LAN) connection including the Ethernet, or a broadband wide-area network (WAN) connection such as a digital subscriber line (DSL), cable high-speed internet connection, dial-up connection, T-1 line, T-6 line, fiber optic connection, or satellite connection. The network connection 606 may connect to a LAN network, a corporate or government WAN network, the Internet, a telephone network, or other network. The network connection 606 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 6.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE-1694 FIREWIRE connector, a Universal Serial Bus (USB) connector (including a mini-B USB interface connector), a serial port connector, a parallel port connector, or other wired connector. In another implementation, the functions of the network connection 606 and the antenna 605 are integrated into a single component.

The camera 607 allows the device 600 to capture digital images, and may be a scanner, a digital still camera, a digital video camera, other digital input device. In one example implementation, the camera 607 is a 6 mega-pixel (MP) camera that utilizes a complementary metal-oxide semiconductor (CMOS).

The microphone 609 allows the device 600 to capture sound, and may be an omni-directional microphone, a unidirectional microphone, a bi-directional microphone, a shotgun microphone, or other type of apparatus that converts sound to an electrical signal. The microphone 609 may be used to capture sound generated by a user, for example when the user is speaking to another user during a telephone call via the device 600. Conversely, the speaker 610 allows the device to convert an electrical signal into sound, such as a voice from another user generated by a telephone application program, or a ring tone generated from a ring tone application program. Furthermore, although the device 600 is illustrated in FIG. 6 as a handheld device, in further implementations the device 600 may be a laptop, a workstation, a midrange computer, a mainframe, an embedded system, telephone, desktop PC, a tablet computer, a PDA, or other type of computing device.

Figure 7:
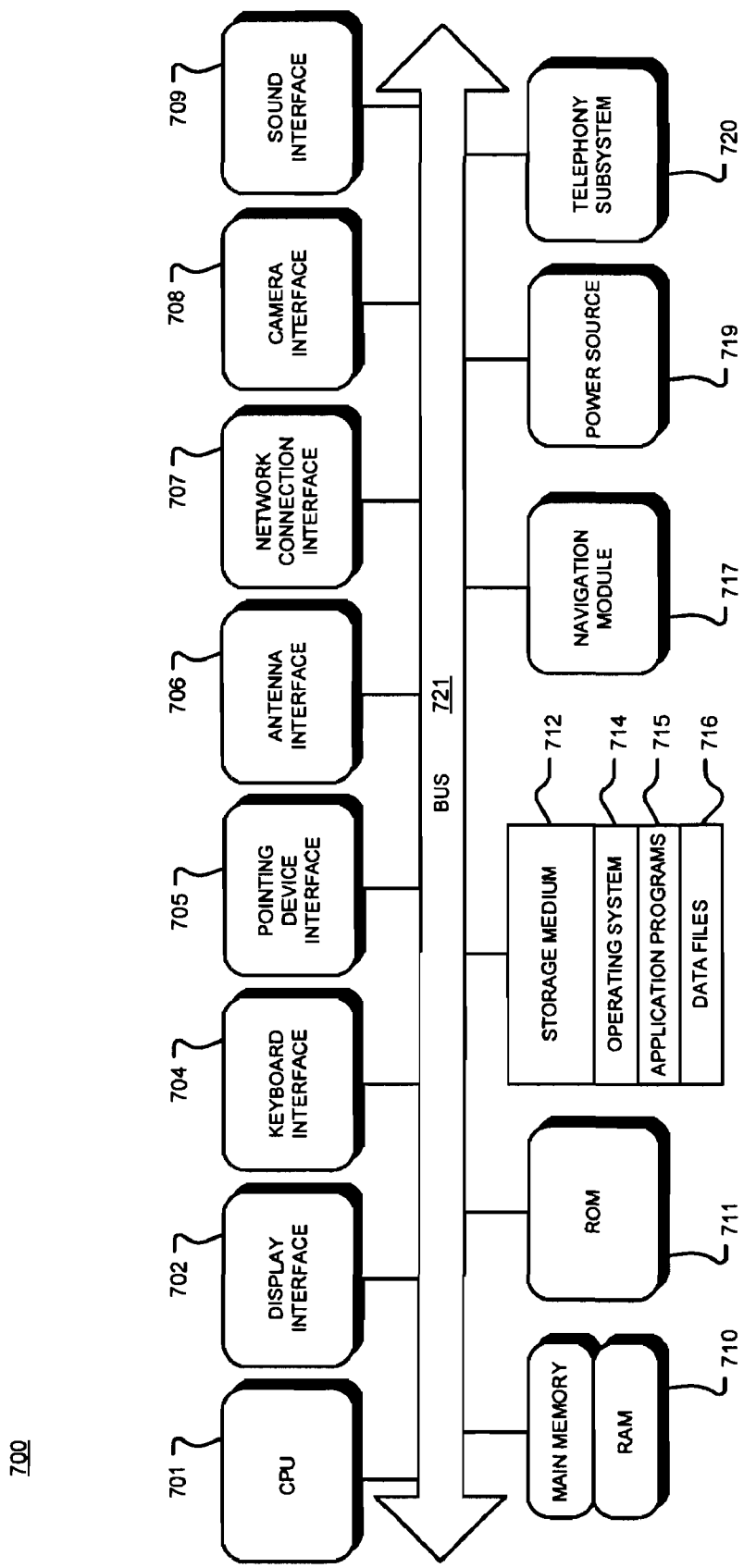
FIG. 7 is a block diagram illustrating the internal architecture of the device of FIG. 6.

FIG. 7 is a block diagram illustrating an internal architecture 700 of the device 600. The architecture includes a central processing unit (CPU) 701 where the computer instructions that comprise an operating system or an application are processed; a display interface 702 that provides a communication interface and processing functions for rendering video, graphics, images, and texts on the display 601, provides a set of built-in controls (such as buttons, text and lists), and supports diverse screen sizes; a keyboard interface 704 that provides a communication interface to the keyboard 602; a pointing device interface 705 that provides a communication interface to the pointing device 607; an antenna interface 706 that provides a communication interface to the antenna 605; a network connection interface 707 that provides a communication interface to a network over the computer network connection 606; a camera interface 708 that provides a communication interface and processing functions for capturing digital images from the camera 607; a sound interface 709 that provides a communication interface for converting sound into electrical signals using the microphone 609 and for converting electrical signals into sound using the speaker 610; a random access memory (RAM) 710 where computer instructions and data are stored in a volatile memory device for processing by the CPU 701; a read-only memory (ROM) 711 where invariant low-level systems code or data for basic system functions such as basic input and output (I/O), startup, or reception of keystrokes from the keyboard 602 are stored in a non-volatile memory device; a storage medium 712 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 714, application programs 715 (including, for example, a web browser application, a widget or gadget engine, and or other applications, as necessary) and data files 716 are stored; a navigation module 717 that provides a real-world or relative position or geographic location of the device 600; a power source 719 that provides an appropriate alternating current (AC) or direct current (DC) to power components; and a telephony subsystem 720 that allows the device 600 to transmit and receive sound over a telephone network. The constituent devices and the CPU 701 communicate with each other over a bus 721.

The CPU 701 can be one of a number of computer processors. In one arrangement, the computer CPU 701 is more than one processing unit. The RAM 710 interfaces with the computer bus 721 so as to provide quick RAM storage to the CPU 701 during the execution of software programs such as the operating system application programs, and device drivers. More specifically, the CPU 701 loads computer-executable process steps from the storage medium 712 or other media into a field of the RAM 710 in order to execute software programs. Data is stored in the RAM 710, where the data is accessed by the computer CPU 701 during execution. In one example configuration, the device 600 includes at least 128 MB of RAM, and 256 MB of flash memory.

The storage medium 712 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 600 to access computer-executable process steps, application programs and the like, stored on removable and non-removable memory media, to off-load data from the device 600, or to upload data onto the device 600.

A computer program product is tangibly embodied in storage medium 712, a machine-readable storage medium. The computer program product includes instructions that, when read by a machine, operate to cause a data processing apparatus to store image data in the mobile device. In some implementations, the computer program product includes instructions that generate a ballot that includes a voting inquiry.

The operating system 714 may be a LINUX-based operating system such as the GOOGLE mobile device platform; Symbian; APPLE MAC OS X; MICROSOFT WINDOWS NT/WINDOWS 2000NT/WINDOWS XP/WINDOWS MOBILE; a variety of UNIX-flavored operating systems; or a proprietary operating system for computers or embedded systems. The application development platform or framework for the operating system 714 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON™, FLASH LITE, or MICROSOFT .NET Compact, or another appropriate environment.

The device stores computer-executable code for the operating system 714, and the application programs 715 such as an email, instant messaging, a video service application, a mapping application word processing, spreadsheet, presentation, gaming, mapping, web browsing, JAVASCRIPT engine, or other applications. For example, one implementation may allow a user to access the GOOGLE GMAIL email application, the GOOGLE TALK instant messaging application, a YOUTUBE video service application, a GOOGLE MAPS or GOOGLE EARTH mapping application, or a GOOGLE PICASA imaging editing and presentation application. The application programs 715 may also include a widget or gadget engine, such as a TAFRI™ widget engine, a MICROSOFT gadget engine such as the WINDOWS SIDEBAR gadget engine or the KAPSULES™ gadget engine, a YAHOO! widget engine such as the KONFABULTOR™ widget engine, the APPLE DASHBOARD widget engine, the GOOGLE gadget engine, the KLIPFOLIO widget engine, an OPERA™ widget engine, the WIDSETS™ widget engine, a proprietary widget or gadget engine, or other widget or gadget engine the provides host system software for a physically-inspired applet on a desktop.

Although it is possible to provide for the creation and transmission of a ballot that includes a voting inquiry using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 717 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, Internet protocol (IP) address, or location information in a database. The navigation module 717 may also be used to measure angular displacement, orientation, or velocity of the device 600, such as by using one or more accelerometers.

Figure 8:
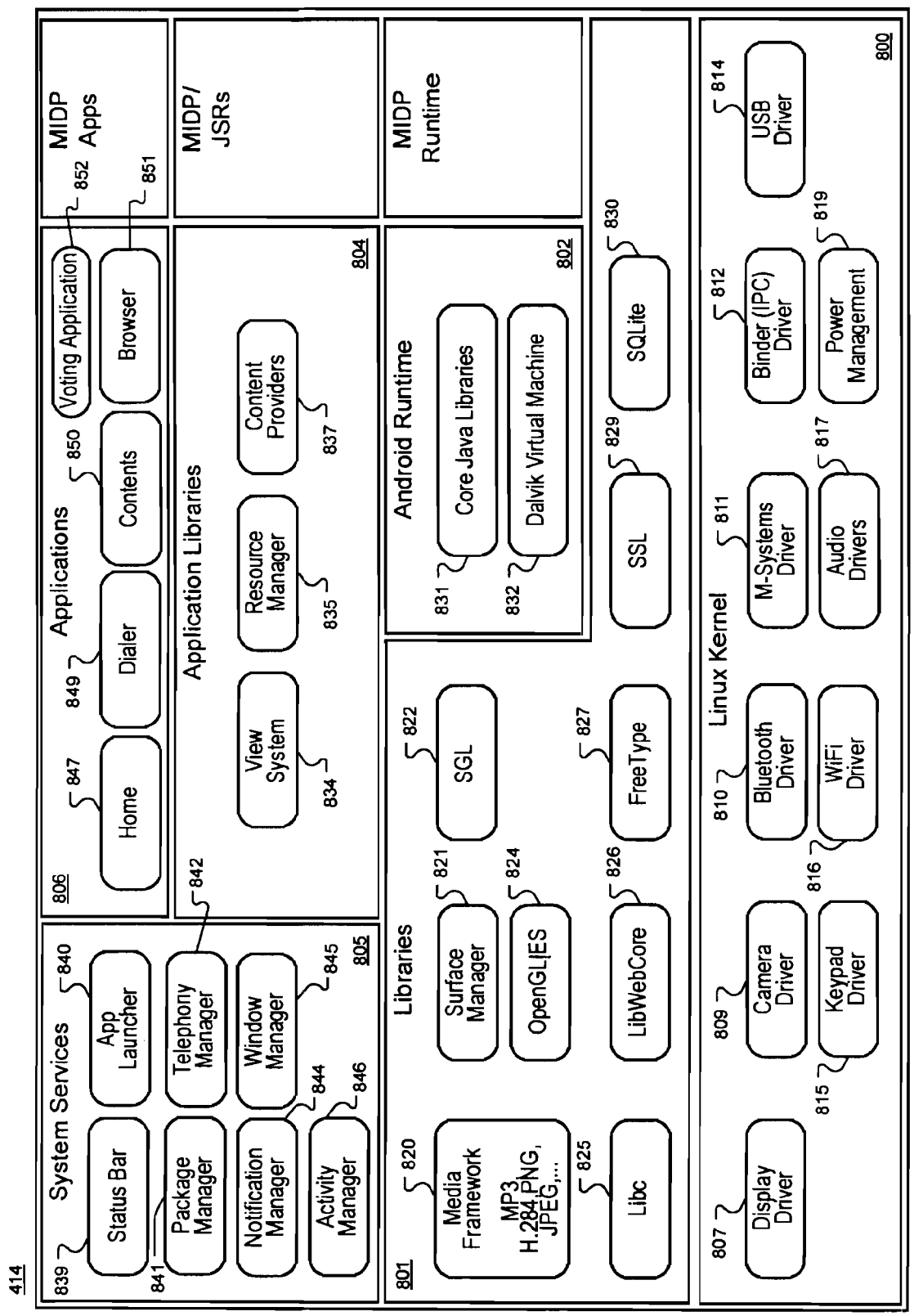
FIG. 8 is a block diagram illustrating exemplary components of the operating system used by the device of FIG. 6.

FIG. 8 is a block diagram illustrating exemplary components of the operating system 714 used by the device 600, in the case where the operating system 714 is the GOOGLE mobile device platform. The operating system 714 invokes multiple processes, while ensuring that the associated phone application is responsive, and that wayward applications do not cause a fault (or "crash") of the operating system. Using task switching, the operating system 714 allows for the switching of applications while on a telephone call, without losing the state of each associated application. The operating system 714 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 714 can generally be organized into six components: a kernel 800, libraries 801, an operating system runtime 802, application libraries 804, system services 805, and applications 806. The kernel 800 includes a display driver 807 that allows software such as the operating system 714 and the application programs 815 to interact with the display 601 via the display interface 702, a camera driver 809 that allows the software to interact with the camera 607; a BLUETOOTH driver 810; a M-Systems driver 811; a binder (IPC) driver 812, a USB driver 814 a keypad driver 815 that allows the software to interact with the keyboard 602 via the keyboard interface 704; a WiFi driver 816; audio drivers 817 that allow the software to interact with the microphone 609 and the speaker 610 via the sound interface 709; and a power management component 819 that allows the software to interact with and manage the power source 819.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or AudioNeodeo Remote Control Profile (AVRCP). The BLUETOOTH driver provides JAVA bindings for scanning, pairing and unpairing, and service queries.

The libraries 801 include a media framework 820 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joint Photographic Experts Group (JREG), and others) using an efficient JAVA Application Programming Interface (API) layer; a surface manager 821; a simple graphics library (SGL) 822 for two-dimensional application drawing; an Open Graphics Library for Embedded Systems (OpenGL ES) 824 for gaming and three-dimensional rendering; a C standard library (LIBC) 825; a LIBWEBCORE library 826; a FreeType library 827; an SSL 829; and an SQLite library 830.

The operating system runtime 802 includes core JAVA libraries 831, and a Dalvik virtual machine 832. The Dalvik virtual machine 832 is a custom, virtual machine that runs a customized file format (.DEX).

The operating system 714 can also include Mobile Information Device Profile (MIDP) components such as the MIDP JAVA Specification Requests (JSRs) components, MIDP runtime, and MIDP applications as shown in FIG. 8. The MIDP components can support MIDP applications running on the device 600.

With regard to graphics rendering, a system-wide composer manages surfaces and a frame buffer and handles window transitions, using the OpenGL ES 824 and two-dimensional hardware accelerators for its compositions.

The Dalvik virtual machine 832 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 804 include a view system 834, a resource manager 835, and content providers 837. The system services 805 includes a status bar 839; an application launcher 840; a package manager 841 that maintains information for all installed applications; a telephony manager 842 that provides an application level JAVA interface to the telephony subsystem 720; a notification manager 844 that allows all applications access to the status bar and on-screen notifications; a window manager 845 that allows multiple applications with multiple windows to share the display 601; and an activity manager 846 that runs each application in a separate process, manages an application life cycle, and maintains a cross-application history.

The applications 806 include a home application 847, a dialer application 849, a contacts application 850, a browser application 851, and a voting application 852.

The telephony manager 842 provides event notifications (such as phone state, network state, Subscriber Identity Module (SIM) status, or voicemail status), allows access to state information (such as network information, SIM information, or voicemail presence), initiates calls, and queries and controls the call state. The browser application 851 renders web pages in a full, desktop-like manager, including navigation functions. Furthermore, the browser application 851 allows single column, small screen rendering, and provides for the embedding of HTML views into other applications.

Figure 9:
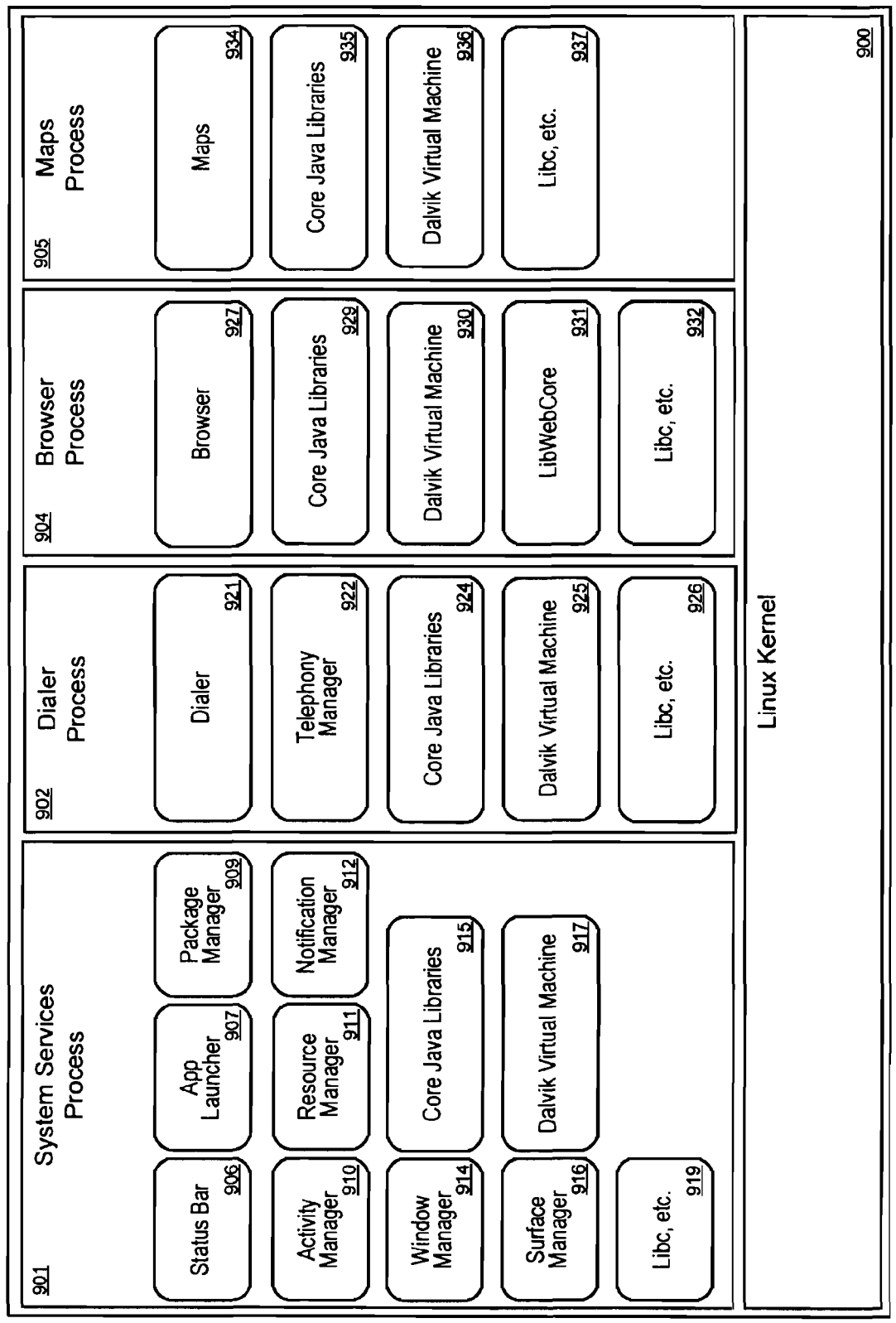
FIG. 9 is a block diagram illustrating exemplary processes implemented by the operating system kernel of FIG. 8.

FIG. 9 is a block diagram illustrating exemplary processes implemented by the operating system kernel 900. Generally, applications and system services run in separate processes, where the activity manager 846 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 916, the window manager 914, or the activity manager 910 can be continuously executed while the device 900 is powered. Additionally, some application-specific process can also be persistent. For example, processes associated with the dialer application 921, may also be persistent.

The processes implemented by the operating system kernel 900 may generally be categorized as system services processes 901, dialer processes 902, browser processes 904, and maps processes 905. The system services processes 901 include status bar processes 906 associated with the status bar 839; application launcher processes 907 associated with the application launcher 840; package manager processes 909 associated with the package manager 841; activity manager processes 910 associated with the activity manager 846; resource manager processes 911 associated with a resource manager 911 that provides access to graphics, localized strings, and XML layout descriptions; notification manger processes 912 associated with the notification manager 844; window manager processes 914 associated with the window manager 845; core JAVA libraries processes 915 associated with the core JAVA libraries 831; surface manager processes 916 associated with the surface manager 821; and Dalvik virtual machine processes 917 associated with the Dalvik virtual machine 832, LIBC processes 919 associated with the LIBC library 825.

The dialer processes 902 include dialer application processes 921 associated with the dialer application 849; telephony manager processes 922 associated with the telephony manager 842; core JAVA libraries processes 924 associated with the core JAVA libraries 831; Dalvik virtual machine processes 925 associated with the Dalvik Virtual machine 832; and LIBC processes 926 associated with the LIBC library 825. The browser processes 904 include browser application processes 927 associated with the browser application 851; core JAVA libraries processes 929 associated with the core JAVA libraries 831; Dalvik virtual machine processes 930 associated with the Dalvik virtual machine 832; LIBWEBCORE processes 931 associated with the LIBWEBCORE library 826; and LIBC processes 932 associated with the LIBC library 825.

The maps processes 905 include maps application processes 934, core JAVA libraries processes 935, Dalvik virtual machine processes 936, and LIBC processes 937. Notably, some processes, such as the Dalvik virtual machine processes, may exist within one or more of the systems services processes 901, the dialer processes 902, the browser processes 904, and the maps processes 905.

A number of embodiments have been described. Nevertheless, it will be understood that various modifications may be made without departing from the spirit and scope of the invention. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:
receiving, at a recipient computing device, from an originating computing device, an electronic voting request, wherein an indication of the originating computing device and an indication of the recipient computing device are each included in a tree structure for reference in distributing the electronic voting request to a plurality of computing devices, the indication of the originating computing device is located at a first level of the tree structure, the indication of the recipient computing device is located at a next-lower, second level of the tree structure, the recipient computing device having been selected for the second level of the tree structure based on at least (1) a messaging plan associated with the recipient computing device or (2) a per message cost incurred for messages sent or received by the recipient mobile device, the originating computing device is associated with a first user, the first user being a first member of a voting group, the recipient computing device is associated with a second user, the second user being a second member of the voting group, and the electronic voting request includes: (1) a voting ballot and (2) instructions that, when executed by a processor, perform operations including:
receiving a first vote from the recipient computing device, the first vote being based on information included in the voting ballot;
transmitting the electronic voting request to a plurality of other computing devices located at a third level of the tree structure, each of the plurality of other computing devices not having previously received the electronic voting request;
receiving a plurality of votes from the plurality of other computing devices; and
transmitting, to the originating computing device, a tally of (i) votes received from the plurality of other computing devices and (ii) the first vote; and
performing the operations.

2. The method of claim 1, wherein the electronic voting request is part of a Short Message Service (SMS) text message.

3. The method of claim 2, wherein the originating computing device transmits and receives SMS text messages without incurring a per-message fee to a person financially responsible for the originating computing device.

4. The method of claim 1, wherein the instructions, when executed by the processor, transmit voting requests and receive votes in different sequences, wherein the sequences reduce a cost of conducting a vote among the members of the voting group relative to a method of conducting a vote where a single computing device transmits a ballot to all members of the voting group.

5. A computer-implemented method, comprising:

sending, by a first computing device, an electronic message including (1) a ballot and (2) forwarding instructions, the electronic message being sent to a second computing device, the second computing device having been selected from among the plurality of other computing devices based on at least (1) a messaging plan associated with the second computing device or (2) a per message cost incurred for messages sent or received by the second mobile device, each computing device from the plurality of other computing devices being associated with a user from a plurality of users who are members of a voting group, wherein the sending the electronic message causes the ballot to be sent to the plurality of other computing devices according to a first sequence determined by the forwarding instructions;

receiving, by the first computing device, from at least the second computing device, a plurality of responses to the ballot, the plurality of responses being received according to a second sequence and being associated with the plurality of users;

selecting, by the first computing device, a third sequence to use for distributing ballot results to the plurality of other computing devices, wherein the third sequence is different than the first sequence; and distributing the ballot results to the plurality of other computing devices according to the third sequence, wherein distributing the ballot results according to the third sequence comprises sending the ballot results to a third computing device that is selected from the plurality of other computing devices, and wherein sending the ballot results to the third computing device causes the ballot results to be sent to the plurality of other computing devices.

6. The method of claim 5, wherein the second sequence is different from the first sequence.

7. The method of claim 6, wherein the second sequence is a reverse of the first sequence.

8. The method of claim 5, wherein the electronic message is a Short Message Service (SMS) message.

9. The method of claim 5, wherein receiving the responses further includes tallying responses to the ballot.

10. The method of claim 5, wherein the first computing device sends and receives text messages without financial cost to a person financially responsible for the first computing device.

11. A computer-implemented system, comprising:

a first computing device;

a voting application of the first computing device to send, from the first computing device, an electronic message including (1) a ballot and (2) forwarding instructions to a second computing device, the second computing device having been selected from among the plurality of other computing devices based on at least (1) a messaging plan associated with the second computing device or (2) a per message cost incurred for messages sent or received by the second mobile device, each computing device from the plurality of other computing devices being associated with a user from a plurality of users who are members of a voting group, wherein the sending the electronic message causes the ballot to be sent to the plurality of other computing devices according to a first sequence determined by the forwarding instructions and a plurality of responses to the ballot to be received from at least the second computing device according to a second sequence; and means for distributing ballot results to the plurality of other computing devices according to a third sequence, wherein distributing the ballot results according to the third sequence comprises sending the ballot results to a third computing device that is selected from the plurality of other computing devices, wherein sending the ballot results to the third computing device causes the ballot results to be provided to the plurality of other computing devices, wherein the third sequence that is different from the first sequence.

12. The system of claim 11, wherein the second sequence is different from the first sequence.

13. The system of claim 12, wherein the second sequence is a reverse of the first sequence.

14. The system of claim 11, wherein the electronic message is a Short Message Service (SMS) message.

15. The system of claim 11, wherein the voting application further tallies responses to the ballot.

16. A computer program product tangibly embodied in a computer readable storage device, the computer program product including instructions that, when executed, perform operations comprising:

generating a first Short Message Service (SMS) message including (1) a voting request and (2) a first set of forwarding instructions;

sending, by an originating computing device, the first SMS message to a first set of computing devices, wherein sending the first SMS message to the first set of computing devices causes the first set of computing devices to send the first SMS message to a second set of computing devices according to a first sequence determined by the first set of forwarding instructions and, in response, the second set of computing devices to send a response to the voting request to the first set of computing devices, each computing device from the first set of computing devices and the second set of computing devices being from a plurality of other computing devices and being associated with a user from a plurality of users who are members of a voting group, the first set of computing devices having been selected from among the plurality of other computing devices based on at least (1) messaging plans associated with the first set of computing devices or (2) per message costs incurred for messages sent or received by the first set of computing devices, wherein an indication of the originating computing device, indications of the first set of computing devices, and indications of the second set of computing devices are each included in a tree structure for reference in distributing the voting request, the indication of the originating computing device is located at a first level of the tree structure, the indications of the first set of computing devices are located at a second level of the tree structure, and the indications of the second set of computing devices are located at a third level of the tree structure;

receiving, by the originating computing device, a plurality of responses to the voting request from the first set of computing devices, the plurality of responses being received according to a second sequence, wherein the plurality of responses include responses from both the first set of computing devices and second set of computing devices;

generating a second SMS message including (1) a result of the voting request and (2) a second set of forwarding instructions;

selecting, by the originating computing device, a third sequence to use for distributing the result to the plurality of other computing devices, wherein the third sequence is different than the first sequence; and sending the second SMS message to a third set of computing devices, each computing device from the third set of computing devices being associated with a user from the plurality of users who are members of the voting group, wherein sending the second SMS message causes the third set of computing devices to send the second SMS message to at least a portion of the other computing devices according to the third sequence determined by the second set of forwarding instructions.

17. The computer program product of claim 16, wherein generating the second SMS message further includes tallying the received response.

18. The computer program product of claim 16, wherein the
third set of computing devices is different from the first set of computing devices.

19. The computer program product of claim 16, wherein the third set of computing devices is different from the second set of computing devices.

20. The computer program product of claim 16, wherein a computing device in the first set of computing devices can send and receive SMS text messages without financial cost to a person financially responsible for the computing device.

21. A method comprising:

receiving, at a computing device, user input that indicates a request to transmit a voting ballot to a plurality of other users associated with other computing devices;

dividing the plurality of other users into a plurality of voting groups;

identifying voting coordinators for the plurality voting groups, wherein the identified voting coordinators have respective voting groups and obtain votes from other members of their respective voting groups, the identified voting coordinators being selected from among the plurality of other users based on at least (1) messaging plans for computing devices that are associated with the identified voting coordinators or (2) per message costs incurred for messages sent or received by the computing devices associated with the identified voting coordinators, and wherein the identified voting coordinators comprise fewer than all of the plurality of other users;

sending, by the computing device, the voting ballot to a portion of the other computing devices that are associated with the identified voting coordinators, wherein providing the voting ballot to the identified voting coordinators causes the voting ballot to be provided to all of the other computing devices that are associated with the plurality of other users; and after sending the voting ballot to the identified voting coordinators, receiving and tabulating votes for the plurality of other users that are received by the computing device from at least the portion of the other computing devices that are associated with the identified voting coordinators.

* * * * *